Nov. 30, 1965  W. C. GRIFFIN  3,220,295
MUSICAL TOY
Filed March 2, 1964  2 Sheets-Sheet 1
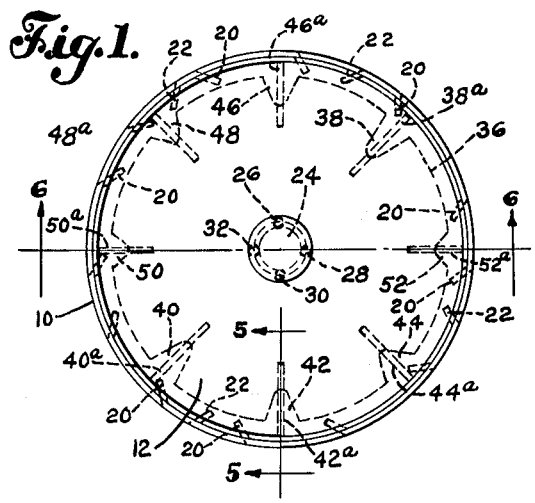
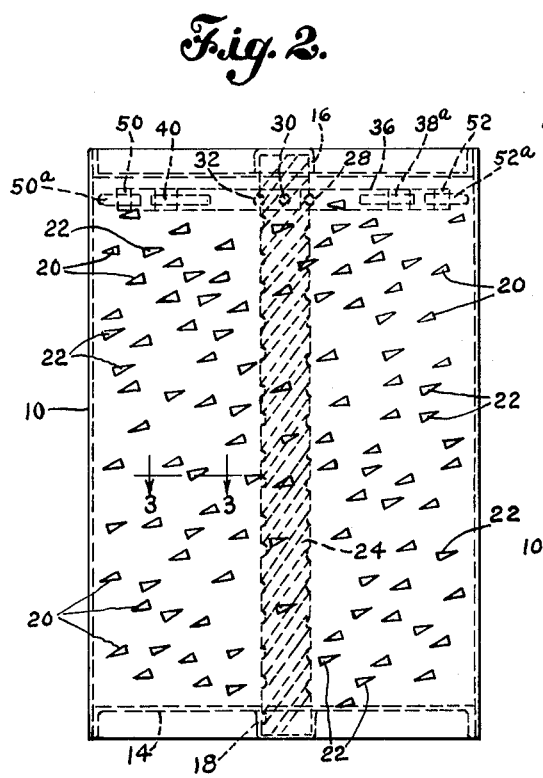
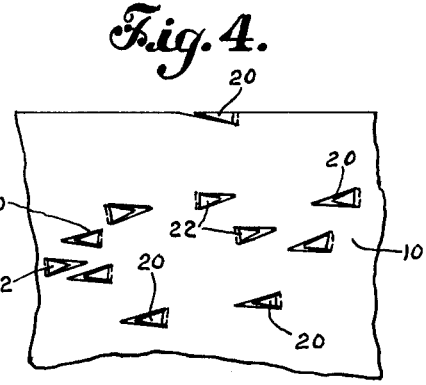
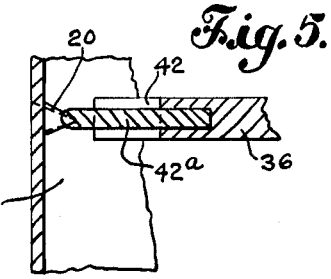
INVENTOR.
William C. Griffin
BY Harold E. Cole
Attorney Nov. 30, 1965         W. C. GRIFFIN            3,220,295
                        MUSICAL TOY
Filed March 2, 1964                    2 Sheets-Sheet 2
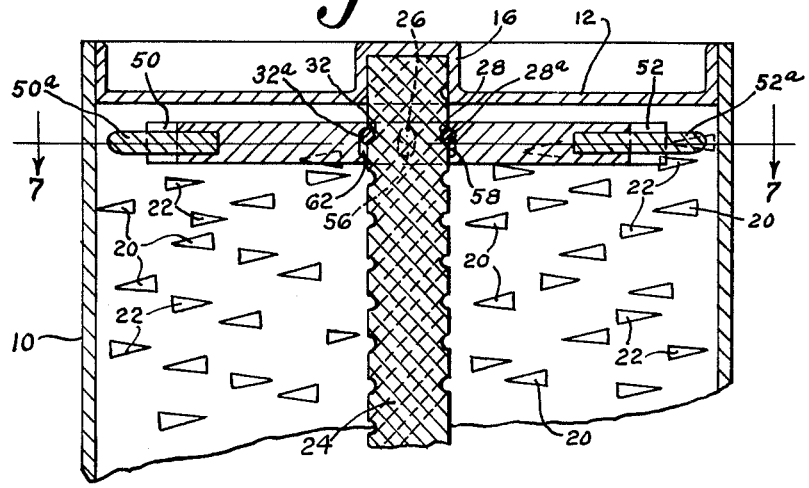
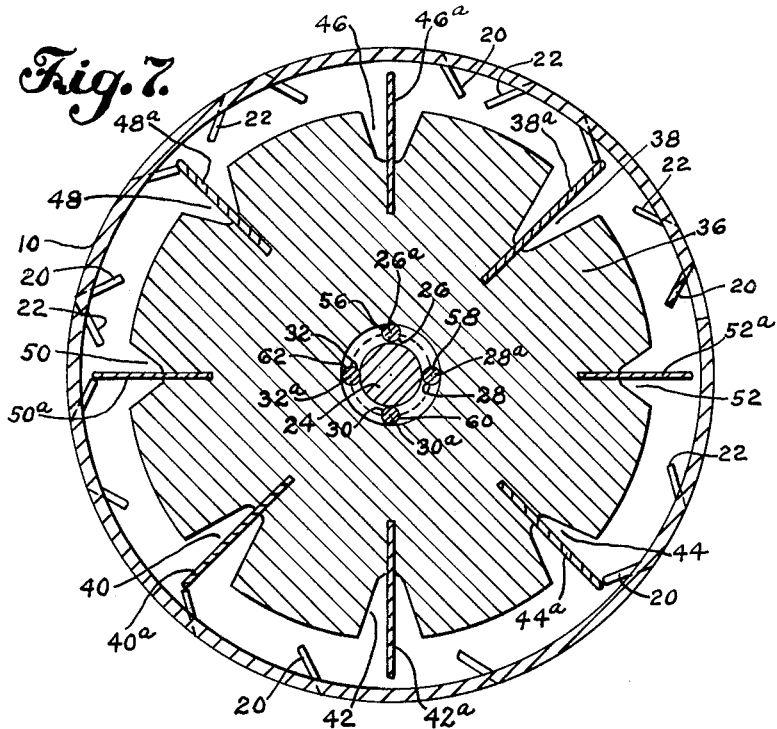
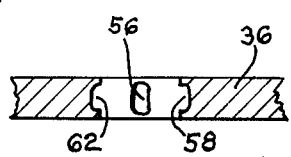
INVENTOR.
William C. Griffin
BY Harold E. Cole
Attorney United States Patent Office 3,220,295
Patented Nov. 30, 1965

3,220,295
MUSICAL TOY
William C. Griffin, 186 Summer St., Walpole, Mass.
Filed Mar. 2, 1964, Ser. No. 348,738
9 Claims. (Cl. 84—97)

This invention relates to a musical toy.

One object of my invention is to provide a musical toy so constructed with moving parts that a tune will be played by gravitational movement of a disc on a shaft within a drum.

Another object is to provide a construction that will enable the disc to maintain proper balance as it travels down a shaft.

Still another object is to provide a disc so formed with cut-outs and reeds that eight notes of a diatonic scale may be sounded as the disc travels down a shaft and contacts plucking protuberances on a drum.

A further object is to provide such a musical toy that will play one tune when my toy is held in one position, and will play another tune by merely reversing the position of my toy, that is, turning it upside down.

A still further object is to provide a musical toy that is formed of parts that can be manufactured rapidly in large volume at a relatively low cost, and that are simple to assemble to make a complete toy.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a top plan view of my musical toy.

FIG. 2 is a front elevational view thereof.

FIG. 3 is an enlarged, sectional view taken on the line 3—3 of FIG. 2.

FIG. 4 is a fragmentary, enlarged, front elevational view showing a portion of the drum for my toy.

FIG. 5 is an enlarged, sectional view taken on the line 5—5 of FIG. 1.

FIG. 6 is an enlarged, sectional view taken on the line 6—6 of FIG. 1.

FIG. 7 is a sectional view taken on the line 7—7 of FIG. 6.

FIG. 8 is a fragmentary, sectional view showing a portion of a disc with grooves therein.

As illustrated, a cylinder or drum 10 has ends or covers 12 and 14 at opposite ends. A bearing portion 16 is formed in the cover 12 while another bearing portion 18 is formed in cover 14. Indents or prongs 20 serving as plucking protuberances extend from said drum 10 laterally and diagonally inward, being shown as triangular indents struck out of the metal or other material forming the drum. Another set of prongs 22 may be used, which are similar to prongs 20, but that extent laterally in a direction opposite to said latter prongs and diagonally inward. The latter prongs 22 are provided when it is intended that my toy plays a tune or otherwise makes sounds when held in either of two different and opposite positions.

A shaft 24 fits tightly in said bearings 16 and 18, being fixed therein and it has spiral grooves 26, 28, 30 and 32 formed therein. I show four of these grooves because they are desirable as later explained, although to some extent the number of grooves, or groove, used depends upon the length of the shaft and also the smoothness of the movement to be effected. In each of said grooves a round ball, such as a well-known ball bearing, extends, the balls being numbered 26a, 28a, 30a, and 32a respectively for the grooves 26, 28, 30 and 32. Preferably less than one-half of the balls projects into said grooves. The shaft may vary in diameter. Ordinarily it would be ½ inch or more.

A disc 36 is movably mounted on said shaft 24 which movement is necessary in producing a tone or any sound. It is spaced peripherally from the inner surface of said drum. This disc has peripheral cut-outs or recesses therein of various depths and upon the latter the differences in tone or sound depend. For instance, recess 38 is formed to produce the sound or approximate sound of low do. Likewise the recesses 40, 42, 44, 46, 48, 50 and 52 are formed to produce respectively the sounds or tones of re, me, fa, sol, la, ti and high do. If the full diatonic scale of musical notes is to be provided, then all eight of the foregoing recesses are formed in said disc 36, although tunes could be played with less than the full scale, hence less than eight recesses.

Set in said disc 36 are reeds or tongues 38a, 40a, 42a, 44a, 46a, 48a, 50a, and 52a which extend respectively through said recesses 38, 40, 42, 44, 46, 48, 50 and 52 and beyond the periphery of said disc, and overlapping slightly said prongs 20 and 22. When a reed is opposite a said prong 20 or 22, it contacts the latter and slides on and over it, causing the reed to vibrate and thus creating a tone. A reed may be made of metal or other suitable material.

Said disc 36 has four grooves therein which are given the numerals 56, 58, 60 and 62 that communicate respectively with the spiral grooves 26, 28, 30 and 32 in said shaft. Said balls 26a, 28a, 30a and 32a extend from said shaft grooves respectively into said grooves 56, 58, 60 and 62, whereby said balls will follow down said shaft grooves as the disc moves spirally down the latter. When it is desired to produce sound by movement of said disc on said shaft in either of two opposite directions, said disc grooves 56, 58, 60 and 62 are made appreciably larger than said balls, hence the mere turning of my toy upside down or in a reverse position enables said balls to automatically move into the correct positions so as to travel along said shaft grooves without any positioning thereof.

Said disc 36 should be of sufficient weight to freely travel down said shaft by gravity. It may be made of metal or other relatively heavy material. For instance it may be ¼ inch thick.

When my musical toy is held upright, as in the starting position shown in said FIG. 2, with said disc 36 at the top of said shaft 24, said balls extend partly into said disc grooves and also partly into said shaft grooves. To insure smooth gravitational movement downward of said disc, it is desirable to use four of said balls as well as four of the grooves in both. Said disc and shaft, since they will keep the disc evenly balanced.

Said prongs 20 are so positioned and spaced apart that said reeds will contact them at various predetermined points to thereby vibrate said reeds to produce the desired tone, hence a complete tune is played as said disc moves spirally downward on said shaft. Every time a reed engages a prong a sound is produced, and which is desirably a part of a complete tune.

When said disc reaches the lower end of said shaft, my toy is turned upside down and said balls drop to what has now become the bottom of said disc grooves, hence said reeds will avoid contact with said prongs 20, and will contact said prongs 22 at predetermined points, hence a different tune will be played as said disc moves to the above-mentioned starting point.

What I claim is:

1. A musical toy comprising a drum, a shaft interiorly of, and fixed to, said drum, a disc movably mounted on said shaft and having a groove therein and spaced peripherally from the inner surface of said drum, said drum having prongs spaced apart and extending diagonally inward from the periphery thereof, said disc having reeds extending beyond the periphery thereof and in overlapping relationship to said prongs whereby when a reed is directly opposite a prong it makes contact therewith and is thereby caused to vibrate, said shaft having a spiral groove therein and a ball extending into said disc groove and said shaft groove and adapted to move downwardly in said shaft groove with said disc.

2. A musical toy as set forth in claim 1 in which said disc has a plurality of peripheral cut-outs therein of varying depths and said reeds extend through said cut-outs and beyond.

3. A musical toy as set forth in claim 1 in which said disc has eight peripheral cut-outs therein each of which varies in depth from all of the others, and said reeds are eight in number and extend through said cut-outs and beyond.

4. A musical toy as set forth in claim 1 in which said drum has two covers removably mounted at opposite ends thereof, each said cover having a bearing portion in which the ends of said shaft fixedly extend.

5. A musical toy comprising a drum, a shaft interiorly of, and fixed to, said drum, a disc movably mounted on said shaft and spaced peripherally from the inner surface of said drum, said drum having prongs spaced apart and extending laterally and inwardly from the periphery thereof, said disc having reeds extending beyond the periphery thereof and in overlapping relationship to said prongs whereby when a reed is directly opposite a prong it makes contact therewith and is thereby caused to vibrate, said shaft having a plurality of spiral grooves therein, said disc having a plurality of grooves therein in communication with said shaft grooves, and balls extending into said shaft grooves and said disc grooves and adapted to move in said grooves as said disc travels downwardly on said shaft.

6. A musical toy as set forth in claim 4 in which said disc has a plurality of peripheral cut-outs therein of a number equal to the number of said reeds, and said reeds extend through said cut-outs and beyond.

7. A musical toy as set forth in claim 4 in which said disc has a plurality of peripheral cut-outs therein of varying depths and said reeds extend through said cut-outs at intermediate points thereof and beyond.

8. A musical toy comprising a drum, a shaft interiorly of, and fixed to, said drum, a disc movably mounted on said shaft and spaced peripherally from the inner surface of said drum, said drum having two sets of prongs spaced apart and extending laterally in two opposite directions and inwardly from the periphery thereof, said disc having reeds extending beyond the periphery thereof, and in overlapping relationship to said prongs whereby when a reed is directly opposite a prong it makes contact therewith and is thereby caused to vibrate, said shaft having a plurality of spiral grooves therein, said disc having a plurality of grooves therein in communication with said shaft grooves, and balls extending into said shaft grooves and said disc grooves and adapted to move in said grooves as said disc travels downwardly on said shaft, said disc grooves being substantially larger than said balls whereby the positions of said balls in said grooves vary and the positions of said disc reeds relative to one set of said prongs may be varied when said toy is reversed by 180 degrees so that said reeds will contact another set of prongs in the latter position upon movement of said disc along said shaft.

9. A musical toy as set forth in claim 8 in which said disc has a plurality of peripheral cut-outs therein of varying depths and said reeds extend through said cut-outs and beyond.

References Cited by the Examiner

UNITED STATES PATENTS

| | | | |
|---|---|---|---|
| 283,307 | 8/1883 | Weeden | 84—94 |
| 329,419 | 10/1885 | Wier | 84—94 |
| 398,241 | 2/1889 | Ehrlich et al. | 84—94 |

FOREIGN PATENTS

| | | |
|---|---|---|
| 51,652 | 4/1890 | Germany. |
| 134,483 | 9/1902 | Germany. |

LEO SMILOW, *Primary Examiner.*